Dec. 3, 1935.  A. R. THOMPSON  2,022,792
PEACH PITTER
Filed June 7, 1933  2 Sheets-Sheet 1
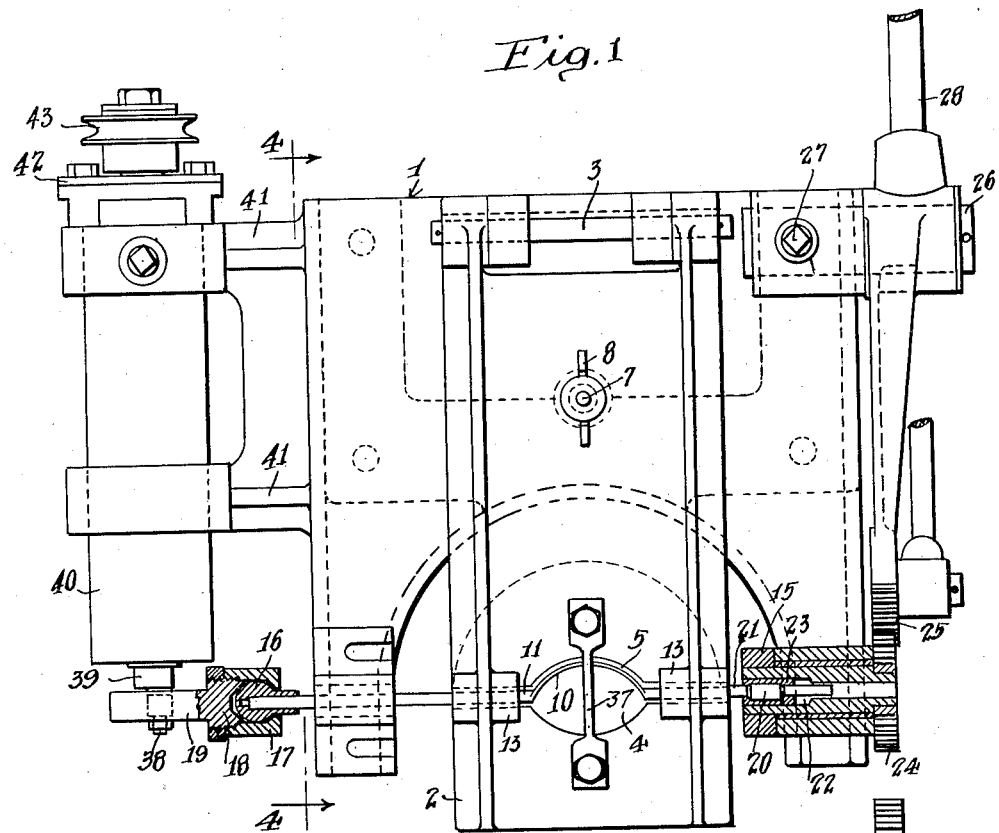
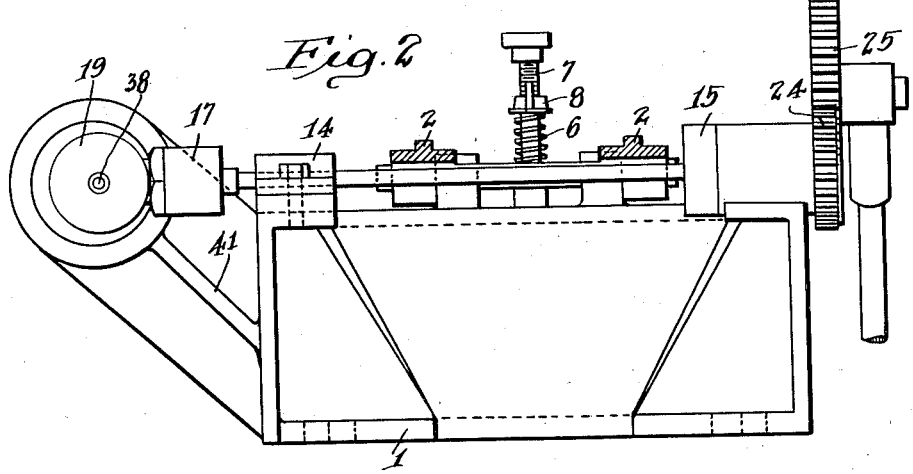
Inventor
Albert R. Thompson
By Lyon & Lyon
Attorneys Dec. 3, 1935.   A. R. THOMPSON   2,022,792
PEACH PITTER
Filed June 7, 1933   2 Sheets-Sheet 2
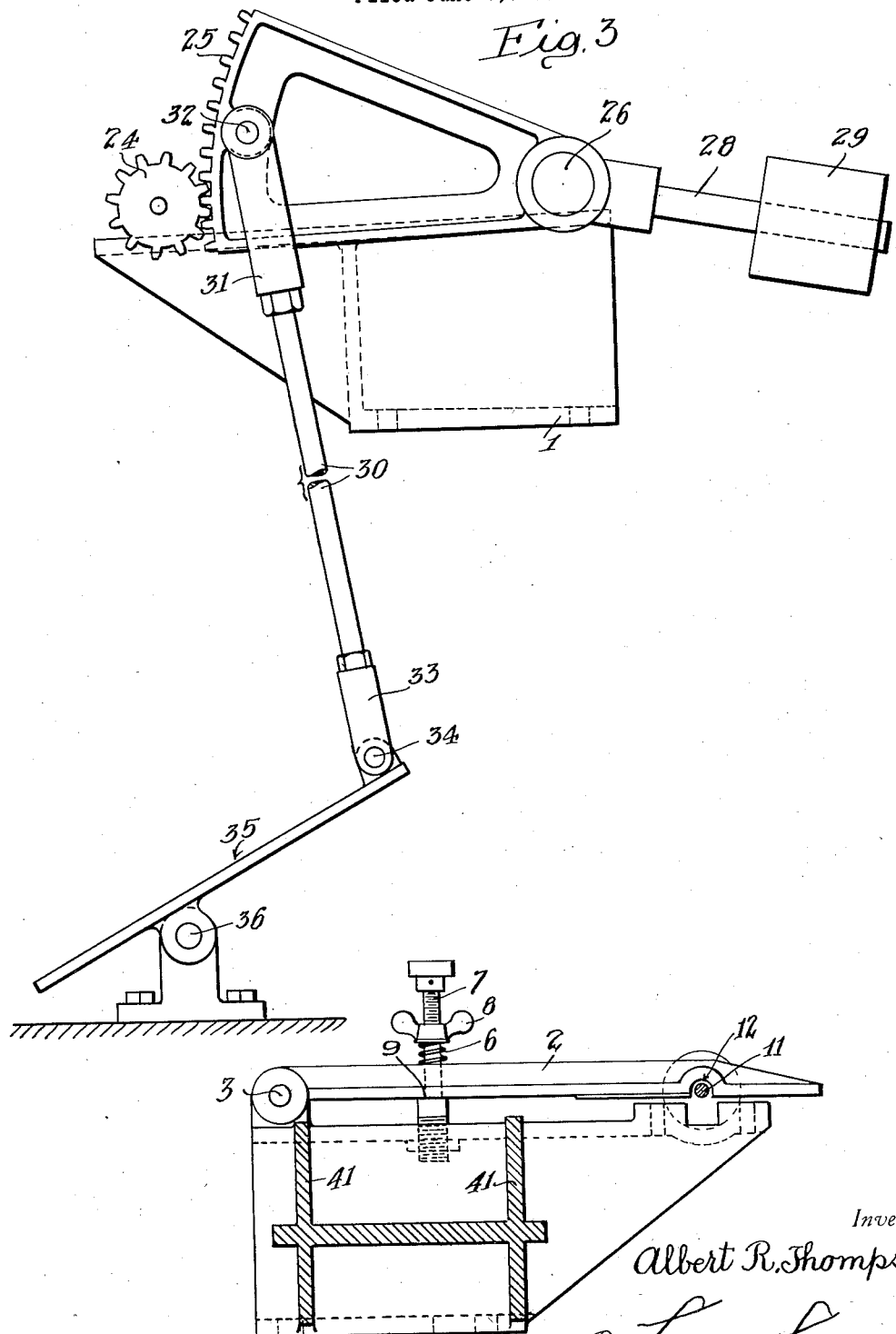
Inventor
Albert R. Thompson
By Lyon & Lyon
Attorneys Patented Dec. 3, 1935

2,022,792

UNITED STATES PATENT OFFICE 2,022,792

PEACH PITTER

Albert R. Thompson, San Jose, Calif., assignor to Pacific Machinery Company, San Francisco, Calif., a corporation of California Application June 7, 1933, Serial No. 674,675

5 Claims. (Cl. 146—28)

This invention relates to peach pitters, and more particularly to a peach pitter adapted for the removal of the pit from previously halved or bisected fruit.

It is an object of my invention to provide a machine applicable for the removal of pit from previously bisected or split fruit in which machine means are provided for enabling the operator to control the depth to which a pitting means cuts into the flesh of the fruit in clearing the pit thereof.

Another object of my invention is to provide a split peach pitter which includes a plate against which the cut surface of a split or halved peach may be pressed with relation to a curved pitting knife in such manner that the operator of the machine is enabled to establish the initial pitting relation between the pit and the curved pitting knife, and which supporting plate is so mounted as to enable the operator to determine the depth of cut of the curved pitting knife with relation to the width or thickness of the pit.

Another object of my invention is to provide a machine for removing the pits from previously halved or bisected fruit in which there is provided an oscillating pitting knife, oscillating in the direction of the axis of rotation of the pitting knife, and means for rotating the oscillating pitting knife so that it is at all times under the manual control by the operator so that the operator is able to feel the operation of the pitting knife in cutting the pit from the flesh of the fruit so that the pitting operation may be varied if the pitting knife strikes an obstruction or protuberance of the pit during the pitting operation.

Other objects and advantages of this invention it is believed will be apparent from the following detailed description of a preferred embodiment thereof as illustrated in the accompanying drawings.

In the drawings:

Figure 1 is a top plan view of a peach pitter embodying my invention.

Figure 2 is a front elevation partly in vertical section of the fruit pitter embodying my invention.

Figure 3 is a side elevation of the right side of the pitting machine as viewed in Figure 1.

Figure 4 is a sectional side elevation taken substantially on the line 4—4 of Figure 1.

In the preferred embodiment of my invention illustrated in the drawings, 1 indicates a frame which is adapted to be secured to any desired form of pitting table. Pivotally mounted upon the frame 1 is a pitting plate 2 which is pivotally supported on the frame 1 by the pivot pin 3.

The half fruit either carrying the half pit of the previously split or bisected fruit, or carrying the half pit of a "split pit" fruit, is held by the operator in substantially horizontal position with its split or cut surface pressed upon the under surface of the pitting plate 2, and the operator, through the visibility of the pit permitted through the pit opening 4 in the plate 2, locates the pit of the fruit with relation to the curved pitting knife 5 so that the curved pitting knife 5 passes the edge of the pit of the fruit on the beginning of the pitting operation.

In order to permit the operator to cause the pitting knife to pass around pits of different thickness, and also the pitting knife 5 to follow a curvature of the pits of varying thickness, the pitting plate 2 is yieldingly or floatingly mounted with relation to the pitting knife 5. The pitting plate 2 is yieldably supported with reference to the frame 1 by means of a spring 6. The spring 6 is mounted upon an adjustment bolt 7. The adjustment bolt 7 is adjustably mounted to the frame 1 that projects upwardly through the plate 2 and the springs 6 as positioned between the upper surface of the plate 2 and an adjustment thumb screw 8 threaded to the bolt 7.

The bolt 7 is formed with a shoulder 9 forming a stop to limit the downward movement of the plate 2. The cutting edge of the knife 5 is beveled outwardly away from the pit as indicated at 10. Assuming a half fruit is pressed against the under surface of the plate 2 and the knife 5 is rotated, if the knife 5 hangs up on the pit the operator presses upwardly on the plate 2 against the spring 6, allowing the knife 5 to pass under the pit and free the obstruction. Likewise the bevel 10 of the knife will cause a yielding between the plate 2 and the knife by riding over the obstruction in such a way as to cause the pit to move upwardly as the knife passes under the obstruction.

In order to permit the relative movement between the pitting knife 5 and the plate 2, the oppositely extending knife shanks 11 pass through large openings 12 in the bearing bosses of the plate 2. The shanks 11 are journaled in bearings 14 and 15 on the frame 1 and are so journaled as to permit oscillatory movement of the pitting knife as it is rotated.

In order to permit oscillation of the pitting knife, the shanks 11 are turned in the bearings 14 and 15 in a manner to permit the free longitudinal movement and one shank 11 is fitted with a ball 16 and secured by means of a socket 17 to the head 18 of the pitman 19.

The other shank 11 is provided with a flattened drive portion 20 which fits within a milled recess formed in a drive block 23 mounted within a bearing sleeve 22. The bearing sleeve 22 is journaled in the bearing 15 and there is secured to the bearing sleeve 22 a pinion 24. The pinion 24 meshes with a rack 25. The rack 25 is journaled on a pivot 26 secured to the frame 1 as indicated at 27. The rack 25 is provided with a balance arm 28 to which a weight 29 is secured. The weight 29 is provided to return the rack to its upper position after the rack has been actuated downwardly to rotate the pitting knife 5 so that the pitting knife 5 will be returned to the plate 2 after each pitting operation.

Foot treadle means are provided for moving the rack 25 downwardly to rotate the pitting knife 5 to pit the fruit, and these treadle means are illustrated as including a treadle rod 30 pivotally secured by a rod head 31 and pin 32 to the rack 25 at one end and by the treadle rod head 33 and pivot 34 to the foot treadle 35 at its opposite end. The foot treadle 35 is pivotally secured by a pivot 36 to the floor in any suitable manner.

A knife guard 37 is secured to the upper surface of the plate 2 to prevent the pits from being pushed through the knife opening and accumulating on the plate 2.

In order to oscillate the pitting knife 5 as it is rotated to sever the half pit from the fruit, the pitman 19 is journaled on a crank pin 38. The crank pin 38 is formed in eccentric position on the oscillator shaft 39. The oscillator shaft 39 is journaled in bearing housing 40 supported from the frame 1 by means of hangers 41. The housing is packed with lubricants for the bearings and is provided with a shaft stuffing box 42 through which the oscillator shaft 39 projects. A pulley 43 is secured to the oscillator shaft and is driven from any suitable or desirable source of power such as an electric motor or a line shaft. The approximate speed of the drive is preferably 4500 R. P. M. and the eccentricity of the crank pin 38 is preferably such as to give to the pitting knife 5 an oscillatory stroke of approximately ⅛ of an inch. The length of stroke or the speed of oscillation are merely illustrative, however, and are not critical and are subject to wide variations.

Having fully described my invention, it is to be understood that I do not wish to be limited to the details herein set forth, but my invention is of the full scope of the appended claims.

I claim:

1. In a fruit pitting machine, the combination of a member providing a surface against which an operator may press the cut surface of a bisected fruit, a pitting orifice in said member, a curved pitting knife adapted to operate through the orifice to pass around the pit of the fruit, the pitting knife having a pair of oppositely extending shanks, means operatively connected with one of the shanks for rotating the pitting knife, and means operatively connected with the other of said shanks to oscillate the pitting knife during its rotation.

2. In a fruit pitting machine, the combination of a pitting knife having a pair of oppositely extending shanks, bearing means for rotatably supporting the oppositely extending shanks, means operatively connected with one of said shanks for rotating the pitting knife, a ball member connected with the other of said shanks, a pitman, a socket for connecting the pitman with the ball member, a shaft adapted to be rotated at relatively high speed, and a crank member connecting the shaft and the pitman.

3. In a fruit pitting machine, the combination of a support against which the surface of a bifurcated fruit is adapted to be held, a pitting knife adapted to operate through an opening in the support to sever the pit from the fruit, said pitting knife having oppositely extending shanks, bearing means for rotatably supporting the opposed shanks of the pitting knife independently of said support, said bearing means being formed so as to permit of longitudinal movement of the shanks within said bearings, means operatively connected with one of said shanks for rotating the pitting knife, and means operatively connected with the other of said shanks for imparting a vibratory motion to the pitting knife in the direction of the axis of rotation of the pitting knife.

4. In a fruit pitting machine, the combination of a frame, a plate against which the surface of a bifurcated fruit is adapted to be held, means for yieldably mounting the said plate with reference to the frame, a pitting knife adapted to operate through an opening formed in the plate to pass around the pit of the fruit held against the plate, the pitting knife having oppositely extending shanks, bearing means mounted upon the frame for rotatably supporting the opposite shanks of the pitting knife, said bearing means being formed to permit of longitudinal movement of the shanks with reference to the bearing means, means operatively connected with one of said shanks for rotating the pitting knife, and means operatively connected with the other of said shanks for imparting a vibratory motion to the pitting knife in the direction of the axis of rotation of the pitting knife.

5. In a fruit pitter, the combination of a pitting plate having a pit observation orifice therein, a curved pitting knife, bearing means for the pitting knife, means for vibrating the pitting knife on its longitudinal axis of rotation, means for rotating the pitting knife to pass the curved pitting knife downwardly through said orifice and around the pit of a fruit held against the under surface of the plate with the pit positioned in the orifice, and means for yieldably supporting the plate to enable the operator by the feel of the cutting operation to control the removal of the pit from the fruit by the curved knife.

ALBERT R. THOMPSON.